United States Patent [19]

Harris

[11] Patent Number: 5,452,910
[45] Date of Patent: Sep. 26, 1995

[54] REAR WHEEL SUSPENSION FOR A BICYCLE AND BICYCLE EQUIPPED THEREWITH

[75] Inventor: Trevor L. Harris, Santa Ana Heights, Calif.

[73] Assignee: Rockshox, Inc., Mountain View, Calif.

[21] Appl. No.: 302,040

[22] Filed: Sep. 9, 1994

[51] Int. Cl.$^6$ .................................................. B62K 25/00
[52] U.S. Cl. ........................................... 280/284; 280/283
[58] Field of Search ................................ 280/275, 281.1, 280/283, 284, 287, 288

[56] References Cited

U.S. PATENT DOCUMENTS

| | | | |
|---|---|---|---|
| 392,523 | 11/1888 | Owen . | |
| 423,471 | 3/1890 | Easthope . | |
| 463,710 | 11/1891 | Mathews . | |
| 465,599 | 12/1891 | McGlinchey . | |
| 1,071,892 | 9/1913 | Diepenhorst et al. | 280/284 |
| 2,756,071 | 7/1956 | Riva | 280/283 |
| 3,982,770 | 9/1976 | Satoh et al. | 280/283 X |
| 4,671,525 | 6/1987 | Ribi | 280/284 |
| 4,735,277 | 4/1988 | Prince | 180/227 |
| 5,205,572 | 4/1993 | Buell et al. | 280/284 |
| 5,282,517 | 2/1994 | Prince | 180/227 |
| 5,284,354 | 2/1994 | McWethy | 280/284 |
| 5,335,929 | 8/1994 | Takagaki et al. | 280/283 |

FOREIGN PATENT DOCUMENTS

| | | |
|---|---|---|
| 4041375 | 6/1992 | Germany . |
| 0003982 | of 1887 | United Kingdom . |
| 0023307 | of 1901 | United Kingdom . |

*Primary Examiner*—Mitchell J. Hill
*Assistant Examiner*—Victor E. Johnson
*Attorney, Agent, or Firm*—Sixbey, Friedman, Leedom & Ferguson; David S. Safran

[57] ABSTRACT

A suspension assembly that is formed of an essentially horizontal swing arm which is pivotally attached at one end to the underside of a bicycle frame by a pair of short links and which carries the rear wheel at an opposite end. The geometry of the suspension assembly is designed to produce a substantially straight line trajectory of the rear wheel in an upward and rearward direction at an angle that is preferably 20°–30° with respect to a vertical line through the wheel axis of rotation to increase traction, making the acceleration forces apply an upward vertical force component to the frame, and a downward component to the frame under braking, independent of wheel position, that reduces rear frame lift (pitch). Furthermore, to obtain a constant pedal "feel," the suspension geometry is also designed so that the maximum vertical height movement of the pedal crank axis of rotation can be kept to less than 5% of the vertical wheel travel (e.g., a 0.25" crank axis height increase for a 4" vertical wheel travel). The suspension is designed to attach to a standard frame leaving room for mounting of the derailleur between the frame and the rear wheel. In a particularly preferred form, the swing arm assembly is provided with a tubular derailleur mount and an upper tube to which the rear wheel brake assembly can be mounted.

22 Claims, 6 Drawing Sheets

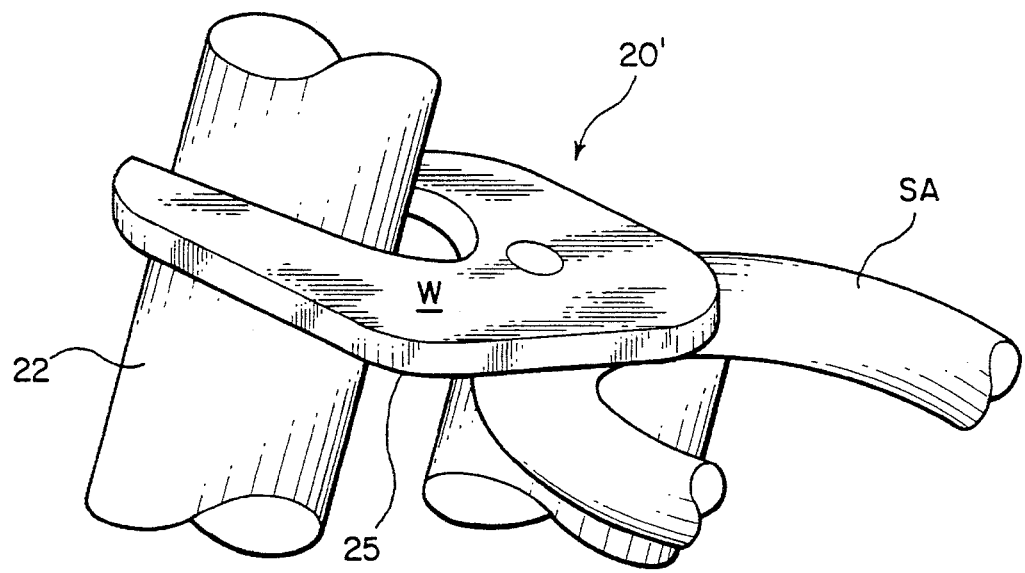
FIG.13
FIG.14(B)
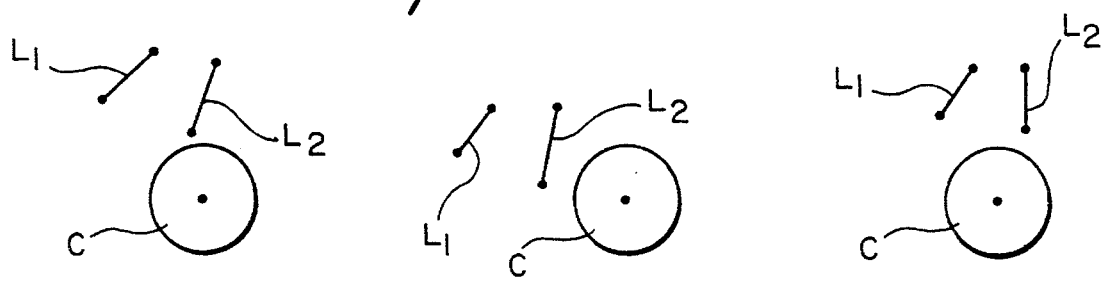
FIG.14(A)          FIG.14(C)

REAR WHEEL SUSPENSION FOR A BICYCLE AND BICYCLE EQUIPPED THEREWITH

BACKGROUND OF THE INVENTION

1. Field of the Invention

The present invention relates to rear wheel suspensions for bicycles. In particular to such suspensions that mount the rear wheel on a swing arm so that, in response to vibration and shocks, the wheel is able to move along a path relative to the bicycle frame against counteracting forces applied to the swing arm by a shock absorbing mechanism.

2. Description of Related Art

Rear wheel suspensions for bicycles of the initially-mentioned type have been known for over a century. While such suspensions have taken on numerous forms (see, e.g., British Patent No. 3982, German Patent No. DE 40 41 375, and U.S. Pat. Nos. 392,523; 423,471; 463,710; 465,599; 2,756,071; 3,982,770; and 5,335,929), constant factors have been the fact that wheel movement has been controlled to move in an arcuate path, in most cases being dictated by the presence of a fixed, single (real or virtual) pivot connection between the frame and the suspension to which the rear wheel is mounted, and the fact that bicycles with these suspensions never were able to find more than limited public acceptance.

The reasons why the prior rear wheel bicycle suspensions never attained wide public acceptance, despite their ability, to a greater or lesser extent, to effectively absorb shocks and vibrations, lie in the fact that they introduced other behavior characteristics that were more disturbing than the shock and vibration problems they solved. That is, unless the pedal crank pivot was mounted at or near the pivot connection of the swing arm to the frame, the vertical component of the swing arm movement would adversely impact on the pedaling "feel" and the rider's ability to effectively apply a constant force to the pedals during riding. Furthermore, since the pedals, and therefore the pedal crank pivot, must be located near the middle of the bicycle (underneath and slightly forward of the seat), a bicycle with such a suspension produces a center hinge effect which leads to several problems affecting riding comfort and performance. In particular, a tendency exists for the front half (main frame) of the bicycle to rock about the pivot connection between it and the swing arm. This rocking movement changes the head angle and is perceived as a bobbing effect similar to riding a children's "rocking horse". Moreover, the suspension can act to absorb a portion of the pedal forces, affecting performance, and this absorption is translated into movement of the suspension, again, affecting riding "feel". Similarly, application of braking forces to the rear wheel would, in reverse, be transmitted into the suspension causing the rider to experience a "sinking" effect. Existing systems have faced have faced one or more other problems as well including traction and braking inconsistencies, and handling inconsistencies under competition conditions, to name just a few.

With the advent of professional bicycle racing, not merely road or track racing, but mountain or dirt bike racing, cross country and downhill (where bicycles travel downhill over rough terrain at speeds of around 40 mph (67 kph)), the demand for high performance bicycle rear suspensions has increased, while the problems of prior bicycle suspensions have been amplified under such racing conditions. That is, the forces to which the suspension is subjected require increased wheel travel to absorb the induced shocks as well as the need to use softer springs for bump compliance (i.e., so that the wheel will follow the bump instead of bouncing off it) for traction purposes. However, changes of this type make previously "invisible" force problems not only apparent, but unacceptable. Put another way, as wheel travel increases, the importance of maintaining consistent (and constant) force functions within the bicycle-rider system increases and this has been obtainable, to date, in most rear suspensions only by the use of very stiff springs to correct for geometry induced problems (many suspensions also limit downward wheel travel from static ride height to zero), thereby sacrificing bump compliance.

In contrast to bicycles, motor vehicle, and particularly motorcycle, rear (drive) wheel swing arm suspensions have been developed which do not use a single pivot motion mechanism. For example, in U.S. Pat. No. 4,735,277, motorcycle drive wheel suspensions are disclosed which use at least two swing arms, one of which is connected to the cycle frame and a second of which is connected to the wheel, in a way which permits the rear wheel to freely move in any direction relative to the frame within the plane of rotation of the wheel and allowing the wheel to move along a plurality of paths. However, considering that this patent contains no disclosure as to what purpose is served by permitting the rear wheel to freely move in any direction relative to the frame within the plane of rotation of the wheel and allowing the wheel to move along a plurality of paths, and given the performance, applied load and ride differences between motorcycles and bicycles, not to mention the presence of a frame-mounted motor instead of a suspension-mounted pedal crank, no practical means or reason to apply such a suspension to a bicycle can be derived from this patent.

Likewise, U.S. Pat. No. 4,671,525, discloses a suspension for the rear wheels of motor vehicles in which the wheel-carrying swing arm forms part of a quadrilateral linkage assembly in which the shock absorbing members can be located between any members and the geometry of the articulated system can be designed to produce movement of the rear wheel along any desired path, the described embodiment attaining an almost linear or slightly curved path having a substantially vertical, upward and rearward inclination. However, while the advantages of this suspension, in addition to being able to be adapted to produce any desired path of movement, are indicated as including its ability to counteract "sinking during an acceleration" and "raising when braked," due to its ability to perform a long elastic excursion, no particular significance is attached to any particular linkage configuration or resultant path of movement relative to this advantage or any other. Thus, since this patent also relates to motor vehicles having a frame-mounted motor instead of a suspension-mounted pedal crank, no practical means or reason can be obtained from this patent to apply such a suspension to a bicycle, again, recognizing the differences in performance, ride and applied forces occurring in the motorcycle context in comparison to bicycles.

Thus, a need still exists for a rear wheel suspension for bicycles which will overcome the above-mentioned problems associated with bicycle swing arm suspensions as they have been constructed to date, and no means to fill that need frown existing motorcycle rear wheel suspensions being apparent. In particular, a need exists for a bicycle rear wheel suspension which will meet the needs of competitive mountain bike racing.

SUMMARY OF THE INVENTION

In view of the foregoing, it is a primary object of the present invention to achieve a swing arm type rear wheel suspension for a bicycle which will avoid the above-mentioned problems associated with prior bicycle suspensions of this type.

In keeping with the foregoing object, a further object of the present invention is to develop a high performance, swing arm type rear wheel suspension for a bicycle having a multi-link swing arm assembly that is particularly adapted to the needs of bicycles, especially mountain bikes for downhill racing, from such standpoints as proper pedal crank location and "feel", wheel excursion path, traction and braking performance, etc.

Still a further object of the present invention is to provide a rear wheel suspension for a bicycle which can be attached to standard bicycle frames with minimal modifications.

These and other objects are achieved in accordance with the present invention. In particular, a preferred embodiment of the invention utilizes a three link suspension assembly that is formed of an essentially horizontal swing arm which is pivotally attached at one end to the underside of the frame by a pair of short links and which carries the rear wheel at an opposite end. The geometry of the suspension assembly is designed to produce an essentially straight line trajectory of the rear wheel in an upward and rearward direction at an angle that is preferably 20°–30° with respect to a vertical line through the wheel axis of rotation to increase traction, making the acceleration forces apply an upward vertical force component to the frame independent of wheel position, and a downward force to the frame under braking which helps to control the frame attitude. Furthermore, to obtain a constant pedal "feel," the suspension geometry is also designed so that the maximum vertical height movement of the pedal crank axis of rotation can be kept to less than 5% of the vertical wheel travel (e.g., a 0.25" crank axis height increase for a 4" vertical wheel travel). The suspension is designed to attach to a frame of a standard shape leaving room for mounting of the derailleur between the frame and the rear wheel. In a particularly preferred form, the swing arm assembly is provided with a tubular derailleur mount and an upper tube to which the rear wheel brake assembly can be mounted.

These and other features of the invention are described below in greater detail with respect to preferred embodiments of the invention and in conjunction with the accompanying figures of the drawings.

BRIEF DESCRIPTION OF THE DRAWINGS

FIG. 13 an alternative form for the lateral stabilizing mechanism;

FIGS. 14(A)–(C) show other relative positions for the converging links relative to the crank of the suspension;

DETAILED DESCRIPTION OF THE PREFERRED EMBODIMENTS

Figure 1A:
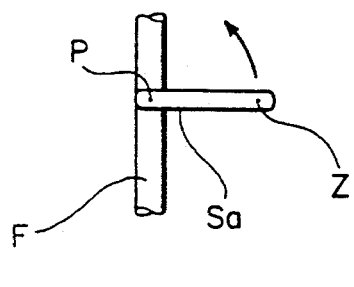
FIGS. 1A & 1B are schematic depictions of a virtual single pivot swing arm as compared to a real single pivot swing arm.
Figure 1B:
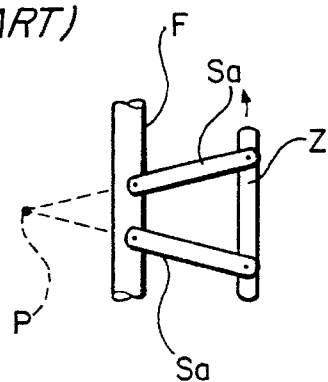

In order to place the present invention in context, it is important to recognize the source of problems associated with conventional single pivot swing arm bicycle suspensions, whether the connection of the swing arm to the bicycle frame is achieved via a real single pivot (FIG. 1A), e.g. a single swing arm sa connected to a bicycle frame F at a fixed location corresponding to pivot axis P or via a virtual single pivot (FIG. 1B), i.e., a multi-link system in which the system pivots the wheel axis z about a pivot axis P which is located at a point in space at which the center line of a pair of swing arms sa converge. Likewise, it is important to point out certain basic constraints within which the designer of a bicycle suspension must work to produce a suspension that is usable with bicycle frames, pedal cranks, wheels, etc., which are conventionally constructed.

Figure 2:
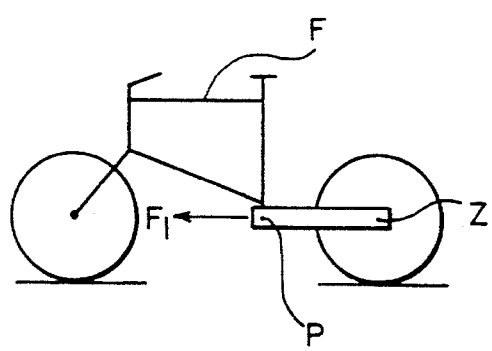
FIGS. 2, 3 and 4 are schematic force diagrams for purposes of describing the behavior of conventional single pivot, swing arm rear wheel suspensions.
Figure 3:
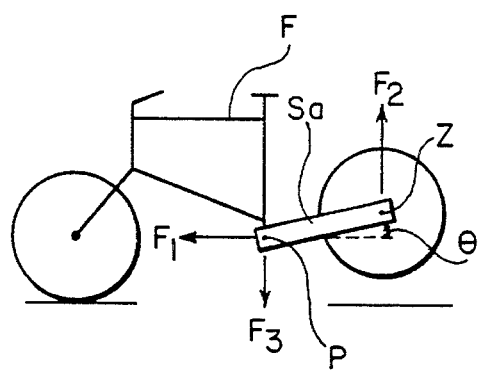

Thus, initial reference is made to FIG. 2 in which a bicycle equipped with a single pivot swing arm is diagrammatically depicted connected to a bicycle frame for rotation about pivot axis P. When the swing arm sa is horizontal, a line through the axes P and z is parallel to the ground, so that a drive force $F_1$ is applied to the frame and no vertical force component acts on the system at pivot axis P or on the wheel at axis z. However, as the wheel moves up relative to the frame and axis P through an angle $\Theta$, the drive force $F_1$, e.g., when it hits a bump as represented in FIG. 3, an upwardly directed vertical force component $F_2$ appears at wheel axis z and a downwardly directed vertical force component $F_3$ appears at pivot axis P. These instantaneous forces at P and z are equal to $F_1 \sin \Theta$ and is equal to half the driving force $F_1$ when $\Theta$ is 30°.

The significance of these vertical components is that when, as shown, the wheel axis z is raised above the pivot axis P, the vertical force component $F_2$ is directed upward and subtracts from the traction that the rear wheel can generate. Furthermore, the vertical force component $F_3$ introduced at P can cause the frame F to move up or down. Additionally, for a given rear wheel travel, as the distance between P and z is shortened, $\Theta$ increases and so do the vertical force components variations, traction functions, attitude variations, etc. Clearly then, longer swing arms for a given wheel travel is desirable since such will reduce force variations as a function of vertical wheel position for any trajectory by reducing $\Theta$ toward zero. However, bicycle swing arms are typically 13–24" long, the distance between the driving sprocket and the driven sprocket (i.e., between axes P and z) is from 16.5–17.5" and the maximum permissible wheel travel set at about 3–4" (this being dictated by the minimum pedal-to-ground clearance given a pedal crank axis mounting height of 12–13" and an 8" distance from the pedal crank axis to the bottom of the pedal and standard wheel diameters of 26–28"). Thus, these constraints lead to large Θ changes for all conventional single pivot rear wheel suspension swing arms, and in turn, to traction and frame attitude variations.

Figure 4:
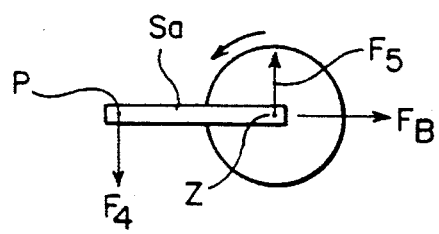

Another factor of significance is braking. Not only are the independently actuated brakes of a bicycle used to stop it, but under racing conditions the brakes are use to control the height and attitude of the bicycle when entering corners (sometimes the rear or front brake is used to "set" the bike's attitude while drifting, i.e., a two-wheel slide, into a corner). When the rear brake is applied, a retarding force acts between the fires and the ground which the bicycle experiences as a force $F_B$ that is directed rearward and parallel to the ground at wheel axis z. The force $F_B$ must be great enough to overcome the mass of the bicycle and its rider, which mass is centered above the height of the front wheel axis. As a result, a significant moment about axis z is created that is proportional to the mass of the bicycle and rider, the height of the mass center above the rear wheel axis z, and the deceleration rate. With reference to FIG. 4, it can be seen that, for a single pivot swing arm, this braking force $F_B$ results in a downward force $F_4$ at axis P and a like upward force $F_5$ at axis z, which act to counteract the mass moment and which increase as the length of the swing arm is decreased. As such, since it is these forces that are used to control bicycle height and attitude, increasing the length of the swing arm to minimize problems of traction and frame attitude variations during riding would counteract the ability of the rider to use the brake caliper forces to enhance anti-lift.

In the above context, the nature and significance of the developments according to the present invention will now be explained. As pointed out above, for a given wheel travel, the longer the swing arm, the smaller the vertical force component imposed on the bicycle which can affect wheel traction and frame attitude, yet in the bicycle context constraints exist which severely limit the length which the swing arm can be made. To overcome the limitation, the present invention utilizes the fact that extremely long swing arms cause the wheel to travel along an arcuate trajectory that approaches a straight line path. Thus, the present invention utilizes a three-link swing arm assembly to produce a rear wheel trajectory which is essentially a straight line so as to produce the effect of an essentially infinite length single pivot swing arm.

Figure 5:
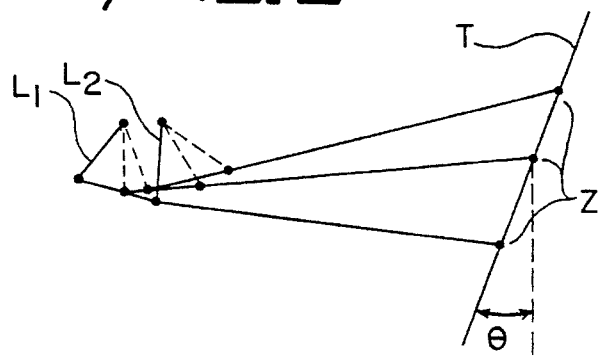
FIG. 5 is a diagrammatic depiction of the production of a straight line trajectory for rear wheel travel via a three link swing arm assembly in accordance with the present invention.

However, as also described above, a long swing arm length will defeat the ability of the rider to control bicycle height and attitude by the application of braking forces. This problem is addressed in accordance with the present invention by making the swing arm rotate and translate so as to produce a linear or slightly radiused rear wheel trajectory in a manner which is not related to the apparent effective length of the swing arm, so that the caliper can "think" it is mounted on a short swing arm to produce the desired anti-lift function. This is achieved by pivotally connecting the "long" swing arm to the frame via a pair of minimum length pivot links. In this regard, FIG. 5 diagrammatically depicts how the swing arm sa can pivot as does a conventional short swing arm, in conjunction with swinging of pivot links $L_1$ and $L_2$ yet the wheel axis z can follow a straight line trajectory T at a rearward angle Θ (preferably 20°–30°) that is set to produce the desired braking force anti-lift component and a vertical component $F_2$, in response to a forward driving force, that acts downward to increase traction over bumps. In the case where the suspension of the present invention is to be applied to a bicycle equipped with a front fork suspension, advantageously, the angle Θ is matched to the angle of the trajectory of movement of the front wheel, such being conventionally around 18°–22°, since this can increase the dynamic stability of the bicycle.

Figure 15:
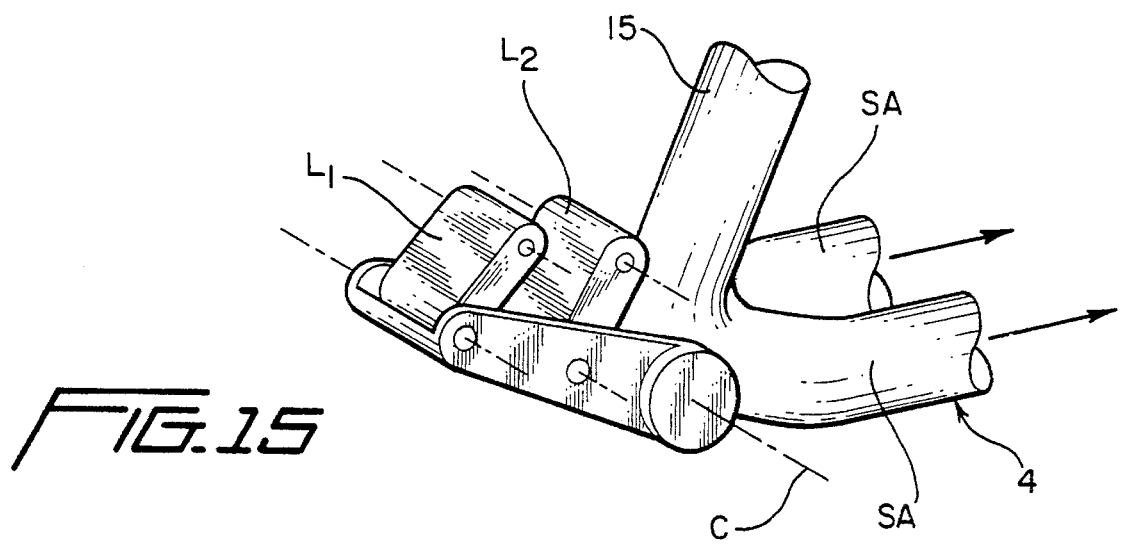
FIGS. 15 & 16 show two forms for the pivot links and their connection to the swing arm of the suspension.
Figure 16:
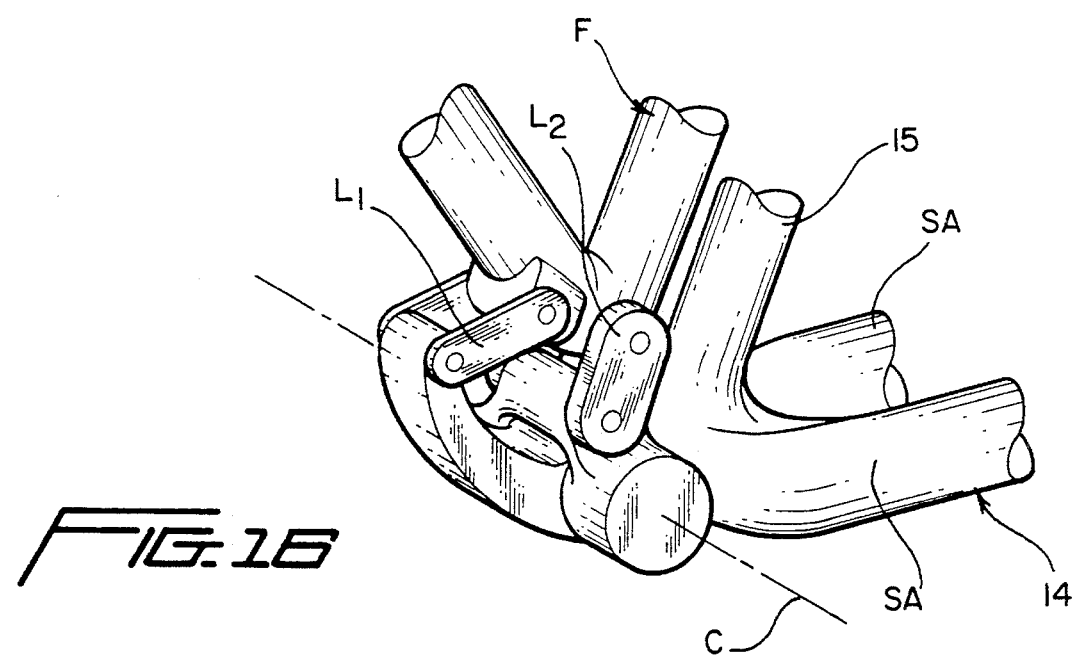
Figure 17:
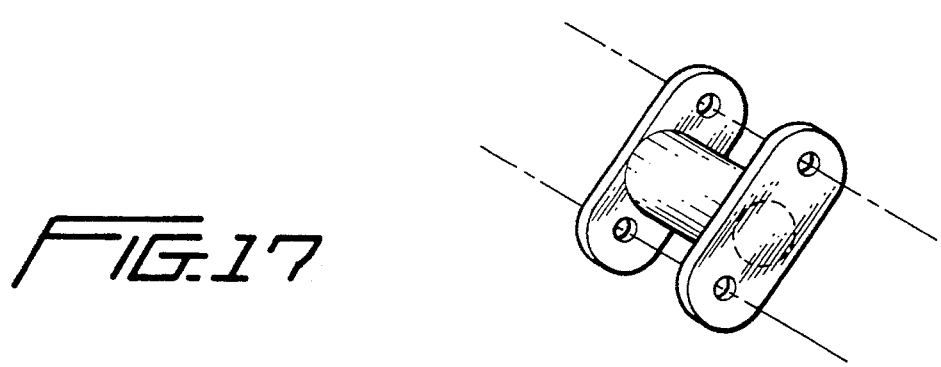
FIG. 17 shows a pivot link of the arrangement shown in FIG. 16.

Specific embodiments for implementing the developments according to the present invention will now be described. In this regard, it is noted that while only a single swing arm assembly (swing arm and connecting links) is described below, it should be appreciated that all embodiments of the present invention possess a pair of identical swing arms SA at each of opposite lateral sides frame and rear wheel of the bicycle. These swing arms may be connected to a common upright or may be separate, and in either case, they are coupled to the frame F by the pivot links $L_1$ and $L_2$, as described below and particularly as shown in FIGS. 15–17.

Figure 6:
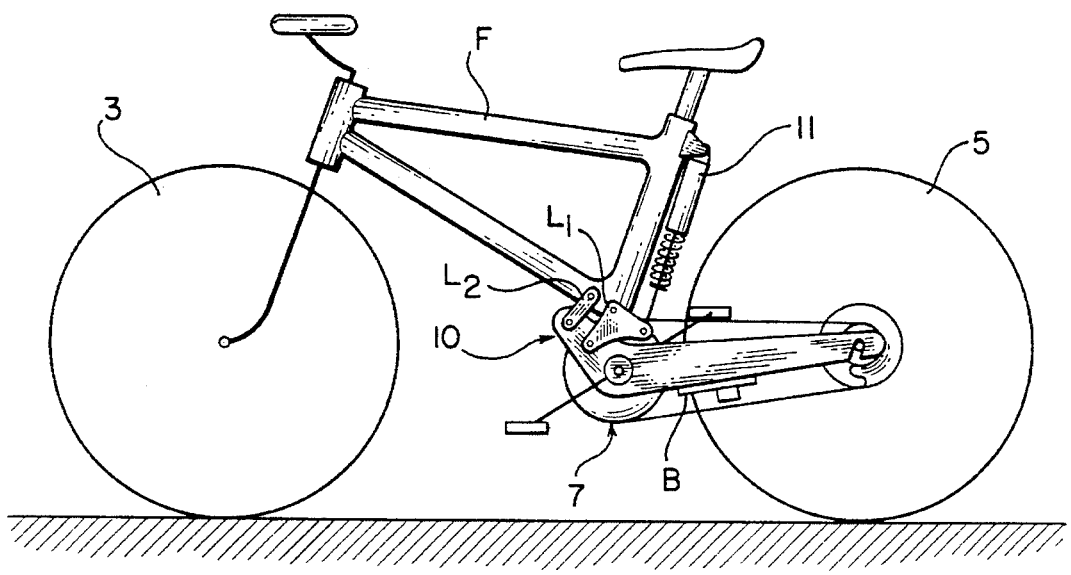
FIGS. 6 and 7 are schematic diagrams of a first embodiment of the present invention.

FIG. 6 shows a bicycle 1 having a frame F, a front wheel 3 that steerably connected to the frame F, a rear wheel 5 that is driven by a pedal-operated chain drive assembly 7, all of conventional design. Additionally, a rear wheel suspension 10 of the pivoting swing arm type is provided which has a swing arm SA having standard wheel axle mounting notches 9 for connecting the rear wheel 5 to a first end thereof. A pedal crank C of the chain drive assembly 7 is rotationally mounted on the swing arm SA as is a mount BR for a brake caliper B.

Figure 7:
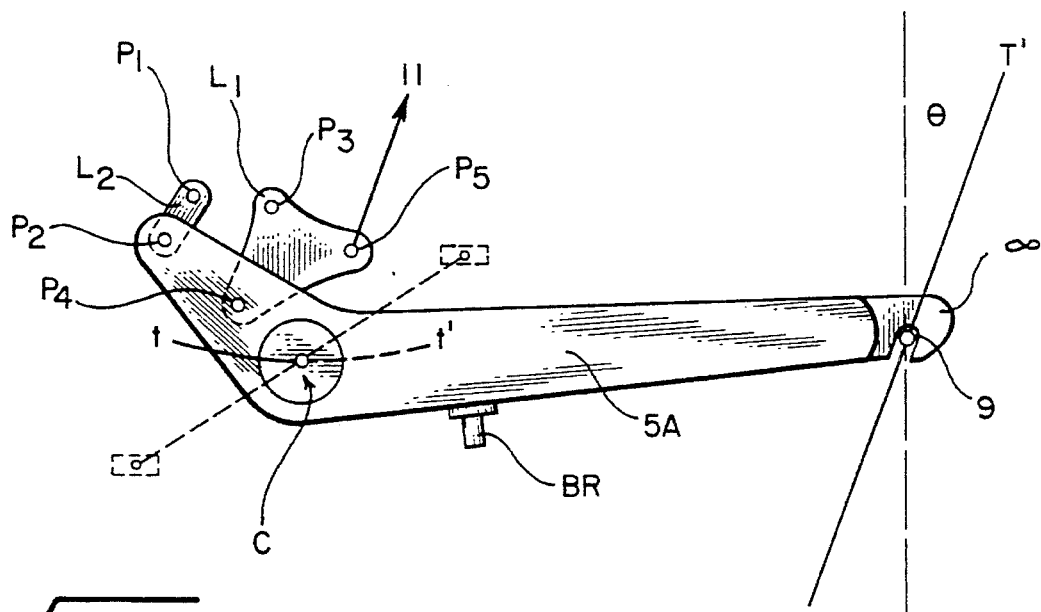

For pivotally connecting the swing arm SA to the frame F of the bicycle near a second end thereof, a pair of upwardly converging links $L_1$, $L_2$ are provided that are relatively short in comparison to swing arm SA, preferably, having a length that is no more than about 10% of the length of the swing arm. A first end of the converging links $L_1$, $L_2$ are pivotally connected to the swing arm SA at $P_2$, $P_4$ near a location at which pedal crank C is rotationally mounted, and a second end thereof is connected to frame F near a lower end thereof at $P_1$, $P_3$. Any form of known shock absorbing means (spring, elastomer, air, hydraulic or hybrid combination thereof) can be connected between the bicycle frame and the suspension at any location thereof; but, in accordance with the present invention, preferably, the connection of a shock absorber 11 to the suspension 10 is provided by a pivotal connection of the shock absorber 11 to an extension of one of the links $L_1$, $L_2$, such as at pivot point $P_3$ shown in FIG. 7, since this allows connection to a point which moves linearly with respect to wheel travel and thereby enabling a linear spring rate curve to be achieved.

An import aspect of the invention is the providing the converging links $L_1$, $L_2$ and swing arm SA with a geometry which produces a trajectory T–T' of rear wheel travel movement at the second end of the swing arm which is a substantially straight line path, preferably at an angle Θ of between 20°–30° and which, at the same time, restricts the maximum vertical movement of the pedal crank to within a range of about 5% to 10% of rear wheel vertical travel based upon a percentage of about 5% for a rear wheel vertical travel of about 4" and a percentage of about 10% for a rear wheel vertical travel of about 2", i.e, the crank axis follows a path t–t' which produces a vertical height displacement of, e.g., 0.25" or less. Various computer programs are available that can be used to determine suitable geometries for the links and swing arm to produce these results are, given the above-mentioned size constraints and the trajectory to be produced, or such can be determined empirically. In this regard, solely by way of example, a swing arm SA of 17" has proved suitable for use with links $L_1$ and $L_2$ of 1.44" and 2.3" respectively to achieve a substantially straight line wheel travel of 4.0".

Figure 8:
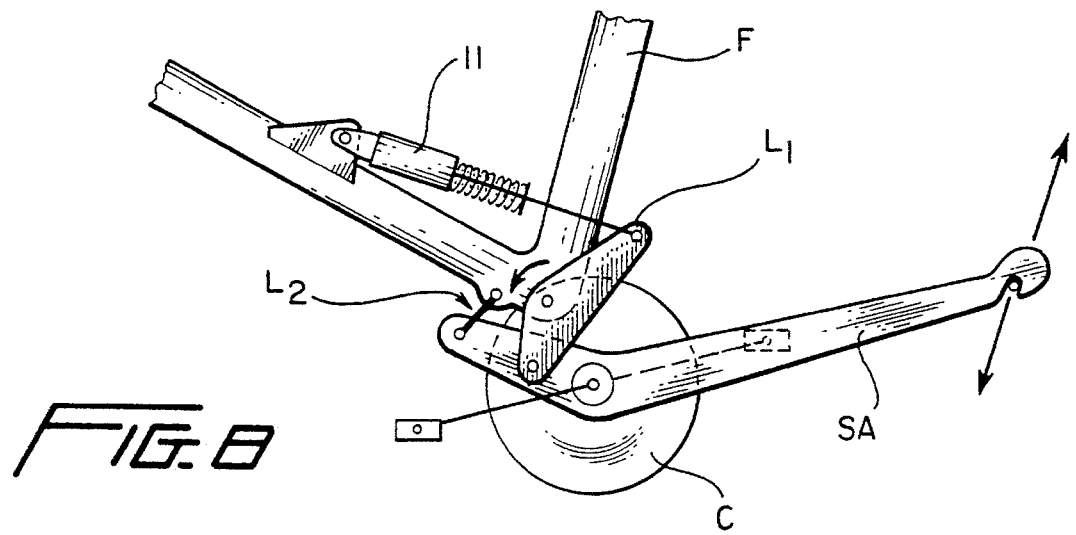
FIGS. 8–10 are schematic diagrams illustrating alternative suspension configurations in accordance with the first embodiment of the present invention.
Figure 9:
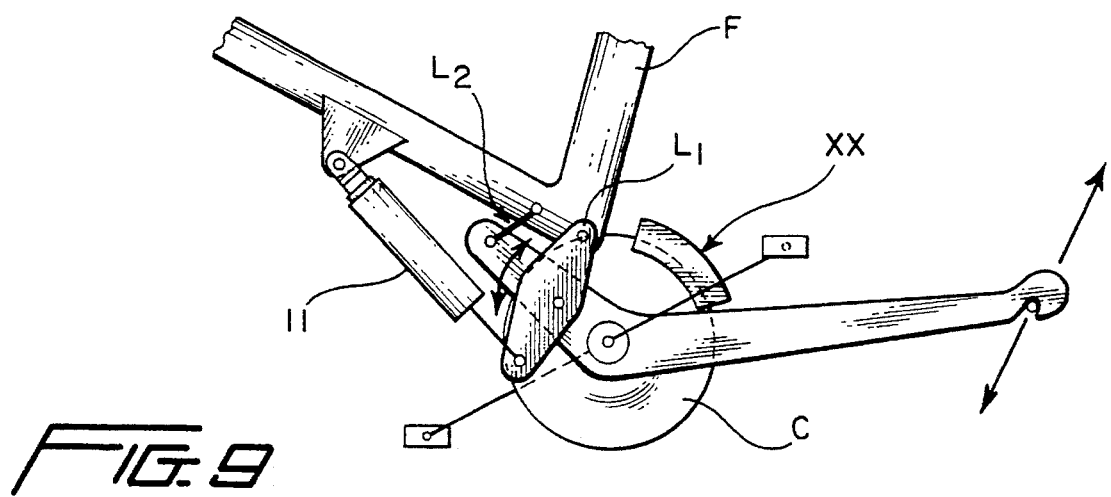
Figure 10:
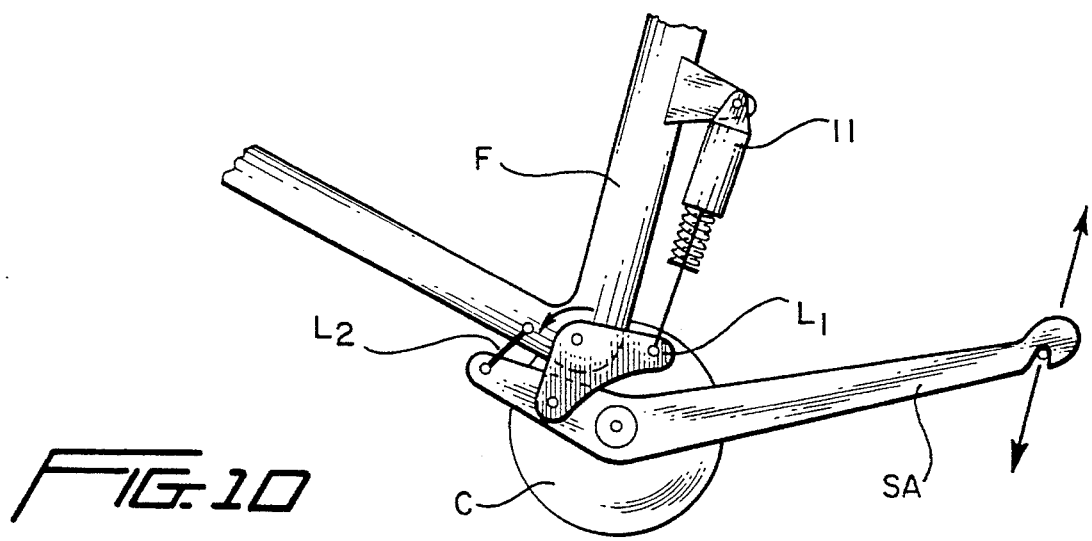

FIGS. 8–10, by way of example only, show other possible configurations for link $L_1$ and placement of shock absorber 11, the arrangement of FIG. 9 offering the advantage of leaving an area xx free for placement of the derailleur of a standard gear shift mechanism. Likewise, FIGS. 14A–C show other relative positions for the converging links $L_1$, $L_2$ relative to the crank C. Changing of the link positions will affect their length, but generally, the link $L_1$ will be always be about 60–70% of the length of $L_2$.

Figure 11:
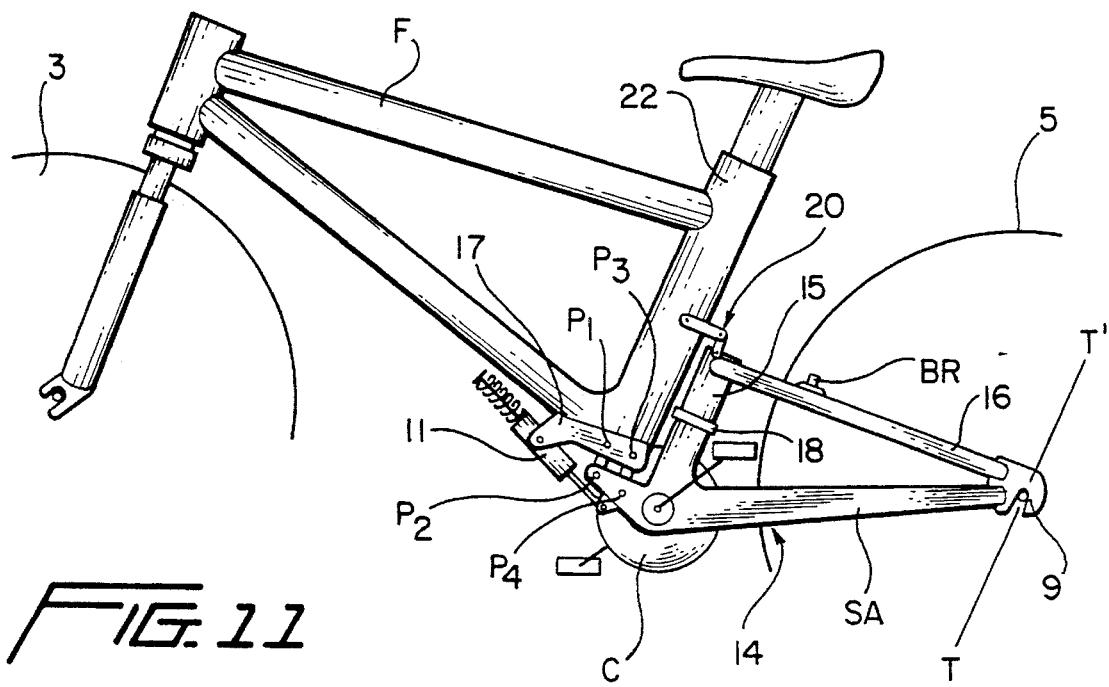
FIG. 11 shows a most preferred embodiment of the invention.
Figure 12:
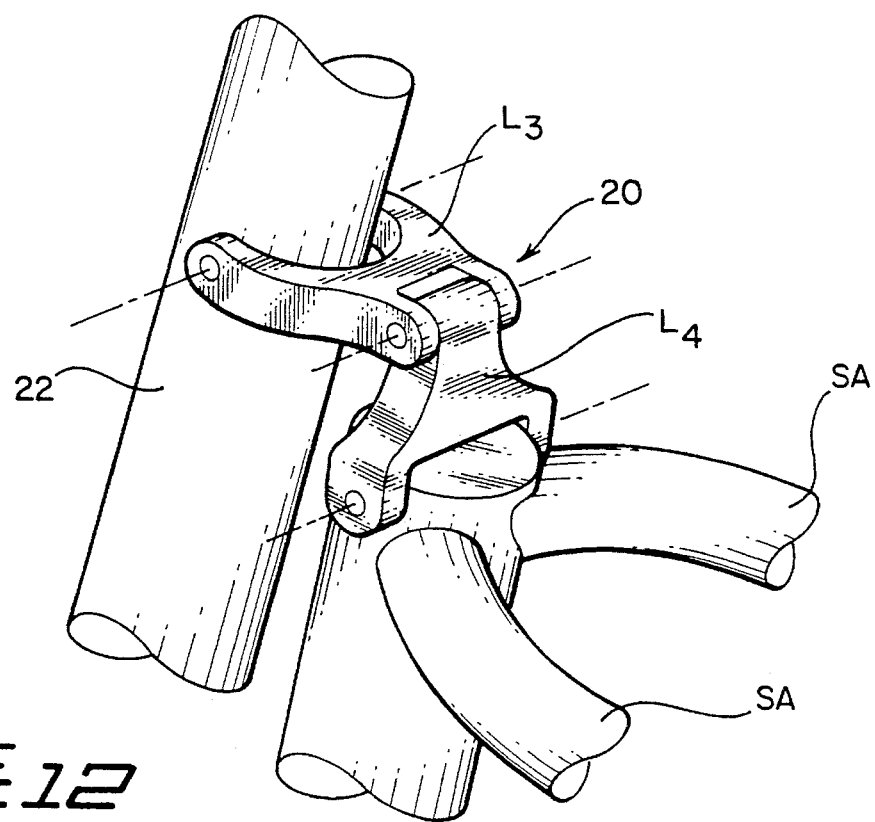
FIG. 12 shows an enlarged perspective view of a lateral stabilizing mechanism of the FIG. 11 embodiment.

FIGS. 11 and 12 show a most preferred embodiment of the present invention. In this embodiment, the swing arm SA is part of a triangular frame-shaped assembly 14 having an upright 15 positioned near the location at which said pedal crank is rotationally mounted and a crosspiece 16 that extends between the upright 15 and the end of the swing arm SA that is connected to the rear wheel 5. This complete assembly 14 attaches to the bicycle frame F by a single bracket 17 at a single interface surface, thereby limiting the modification which must be made to frame F to the provision of a mounting surface for bracket 17. A rear wheel brake mount BR for a brake caliper is provided on crosspiece 16 and a mount 18 for the derailleur of a gear shift mechanism is provided on the upright 15 of the frame-shaped assembly 14.

This triangular configuration of the assembly 14 provides increased structural rigidity. Moreover, a lateral support means 20 can be carried by the upright 15. The lateral support means 20 serves for restricting lateral deflection of assembly 14 in a manner which will not affect the trajectory T–T of rear wheel travel movement produced by the geometry of converging links $L_1$, $L_2$ and swing arm SA. In a first form, the lateral support means 20 comprises a pair of scissor links $L_3$, $L_4$ that are pivotally connected to each other, scissor link $L_3$ being pivotally connected to the seat post 22 of the bicycle frame F and the scissor link $L_4$ being pivotally connecting to the upright 15. The scissor links $L_3$, $L_4$ can be very small, e.g., only 1" between pivot connections, since they serve only for lateral stability and need only execute a very small vertical displacement of the pivot point on upright 15. As such they do not constitute an appreciable added weight.

An alternative form of lateral support means 20' comprises a fork-shaped bracket 25 connected to the top of upright 15. Bracket 25 has a pair of guide arms 26, 27 which slidingly straddles the seat post 22 of the bicycle frame F.

As mentioned above, the two swing arms SA, whether separate or connected, are preferably joined to the frame by a single pair of links $L_1$ and $L_2$. The reason for this is that use of a single pair of links (instead of to pairs of links) enables the links $L_1$, $L_2$ to resist lateral loads and optimally also torsional deflections. In FIG. 15, solid links $L_1$, $L_2$ are shown mounted on pins which extend between rigid plate-shaped extensions of the assembly 14. In contrast, FIG. 16 shows an assembly 14 having a solid link-mounting extension to which the H-shaped links $L_1$, $L_2$ shown in FIG. 17 mount. The H-shaped links $L_1$, $L_2$ shown in FIG. 17 are also suitable for use when separate swing arms SA are used instead of the assembly 14.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. In a bicycle rear wheel suspension of the pivoting swing arm type with a swing arm having mounting means for connecting a bicycle rear wheel to a first end thereof, pivot means for pivotally connecting the swing arm to a bicycle frame adjacent a second end thereof, a pedal crank rotationally mounted on the swing arm, and shock absorbing means for connection between the bicycle frame and the suspension; wherein said suspension comprises said pivot means being formed of a pair of upwardly converging links that are shorter in comparison to said swing arm being a minor percentage of the length of the swing arm, a first end of said converging links being pivotally connected to the swing arm adjacent a location at which said pedal crank is rotationally mounted; and wherein said converging links and swing arm having a size, shape and relative positions which forms both a means for producing a trajectory of rear wheel travel movement at the second end of the swing arm which is a substantially straight line path and a means for restricting maximum vertical movement of the pedal crank to within a range of about 5% to 10% of rear wheel vertical travel based upon a percentage of about 5% for a rear wheel vertical travel of about 4" and a percentage of about 10% for a rear wheel vertical travel of about 2".

2. A bicycle rear wheel suspension according to claim 1, wherein a rear wheel brake means is mounted on the swing arm.

3. A bicycle rear wheel suspension according to claim 1, wherein a mount for a gear shift derailleur is provided on the swing arm.

4. A bicycle rear wheel suspension according to claim 1, wherein said converging links have a length that is no more than about 10% of the length of the swing arm.

5. A bicycle rear wheel suspension according to claim 1, wherein said swing arm is part of a triangular frame-shaped assembly having an upright positioned adjacent the location at which said pedal crank is rotationally mounted; and wherein lateral support means is carried by said upright, said lateral support means having means for restricting lateral deflection of said assembly without affecting the trajectory of rear wheel travel movement produced by the geometry of said converging links and swing arm.

6. A bicycle rear wheel suspension according to claim 5, wherein said lateral support means comprises a pair of scissor links pivotally connected to each other, one of said scissor links being pivotally connected to said upright and the other of said scissor links having means for pivotally connecting it to the bicycle frame.

7. A bicycle rear wheel suspension according to claim 5, wherein said lateral support means comprises a fork-shaped bracket connected to said upright and having guide arms for slidingly straddling a vertical post of the bicycle frame.

8. A bicycle rear wheel suspension according to claim 5, wherein a rear wheel brake means is mounted on a crosspiece of the frame-shaped assembly that extends between the upright and said second end of the swing arm.

9. A bicycle rear wheel suspension according to claim 5, wherein a derailleur is mounted on the upright of the frame-shaped assembly.

10. A bicycle rear wheel suspension according to claim 1, wherein the shock absorbing means is connected to an extension of one of said converging links.

11. A bicycle rear wheel suspension according to claim 1, wherein said trajectory of rear wheel travel movement is inclined upwardly and rearwardly at an angle 20°–30° with respect to a vertical line passing through the mounting means for connecting the bicycle rear wheel to the first end of the swing arm.

12. A bicycle having a frame, a front wheel steerably connected to the frame, a driven rear wheel, and a rear wheel suspension of the pivoting swing arm type with a swing arm having mounting means for producing a connection of the rear wheel of the bicycle to a first end thereof, pivot means for pivotally connecting the swing arm to the frame of the bicycle adjacent a second end thereof, a pedal crank rotationally mounted on the swing arm, and shock absorbing means connected between the bicycle frame and the suspension; wherein said suspension comprises said pivot means being formed of a pair of upwardly converging links that are substantially shorter in comparison to said swing arm being a minor percentage of the length of the swing arm, a first end of said converging links being pivotally connected to the swing arm adjacent a location at which said pedal crank is rotationally mounted and a second end thereof being connected to said frame; and wherein said converging links and swing arm have a size, shape and relative positioning which forms both a means for producing a trajectory of rear wheel travel movement at the second end of the swing arm which is a substantially straight line path and forming a means for restricting maximum vertical movement of the pedal crank to within a range of about 5% to 10% of rear vertical travel based upon a percentage of about 5% for a wheel vertical travel of about 4" and a percentage of about 10% for a rear wheel vertical travel of about 2".

13. A bicycle according to claim 1, wherein a rear wheel brake means is mounted on the swing arm.

14. A bicycle according to claim 12, wherein a derailleur is mounted on the swing arm.

15. A bicycle according to claim 12, wherein said converging links have a length that is no more than about 10% of the length of the swing arm.

16. A bicycle according to clam 12, wherein said swing arm is part of a triangular frame-shaped assembly having an upright positioned adjacent the location at which said pedal crank is rotationally mounted; and wherein lateral support means is carried by said upright, said lateral support means having means for restricting lateral deflection of said assembly without affecting the trajectory of rear wheel travel movement produced by the geometry of said converging links and swing arm.

17. A bicycle according to claim 16, wherein said lateral support means comprises a pair of scissor links pivotally connected to each other, one of said scissor links being pivotally connected to said upright and the other of said scissor links being pivotally connecting to the bicycle frame.

18. A bicycle according to claim 16, wherein said lateral support means comprises a bracket connected to said upright and having guide arms slidingly straddling a vertical post of the bicycle frame.

19. A bicycle rear wheel suspension according to claim 16, wherein a rear wheel brake means is mounted on a crosspiece of the frame-shaped assembly that extends between the upright and said second end of the swing arm.

20. A bicycle rear wheel suspension according to claim 16, wherein a mounted for a derailleur of a gear change mechanism is provided on the upright of the frame-shaped assembly.

21. A bicycle rear wheel suspension according to claim 12, wherein the shock absorbing means is connected to an extension of one of said converging links.

22. A bicycle rear wheel suspension according to claim 12, wherein said trajectory of rear wheel travel movement is inclined upwardly and rearwardly at an angle of 20°–30° with respect to a vertical line passing through the connection of the bicycle rear wheel to the first end of the swing arm.

* * * * *